United States Patent [19]

Shibahata et al.

[11] Patent Number: 4,666,013
[45] Date of Patent: May 19, 1987

[54] STEERING CONTROL SYSTEM FOR WHEELED VEHICLE

[75] Inventors: Yasuji Shibahata, Yokohama; Yukio Fukunaga, Zushi; Kenji Nakamura, Yokohama; Yasumasa Tsubota, Yokosuka; Namio Irie; Junsuke Kuroki, both of Yokohama, all of Japan

[73] Assignee: Nissan Motor Co., Ltd., Japan

[21] Appl. No.: 695,478

[22] Filed: Jan. 28, 1985

[30] Foreign Application Priority Data

Jan. 31, 1984 [JP] Japan .................................. 59-15343

[51] Int. Cl.$^4$ .............................................. B62D 5/00
[52] U.S. Cl. ...................... 180/141; 91/368; 91/385; 180/142; 280/91; 364/424
[58] Field of Search ............... 180/140, 141, 142, 143, 180/79, 79.1; 280/91; 364/424; 74/388 P, 388 S; 60/385, 386; 91/536, 385, 386; 92/7, 131, 117 R, 117 A

[56] References Cited

U.S. PATENT DOCUMENTS

| | | | |
|---|---|---|---|
| 2,597,259 | 5/1952 | Pray | 91/385 X |
| 3,866,706 | 2/1975 | Lincke et al. | 180/142 |
| 4,418,780 | 12/1983 | Ito et al. | 180/142 |
| 4,441,572 | 4/1984 | Ito et al. | 180/140 |

FOREIGN PATENT DOCUMENTS

| | | |
|---|---|---|
| 0089631 | 9/1983 | European Pat. Off. . |
| 0089512 | 9/1983 | European Pat. Off. . |
| 1583873 | 12/1969 | France . |
| 12866 | 1/1983 | Japan .................. 180/143 |
| 1379606 | 1/1975 | United Kingdom ........... 180/141 |
| 2083422 | 3/1982 | United Kingdom . |

Primary Examiner—John J. Love
Assistant Examiner—Mitchell J. Hill
Attorney, Agent, or Firm—Leydig, Voit & Mayer

[57] ABSTRACT

A wheeled vehicle is equipped with a feedforward steering control system which steers the vehicle through front or rear road wheels in accordance with a driver's steering input such as an angular displacement of a steering wheel, and a negative feedback system which senses a turning behavior of the vehicle such as a yaw rate or a lateral acceleration, and steers the vehicle through the front or rear wheels in such a negative direction as to reduce the turning behavior. The feedforward system may control the angular direction of the front or rear wheels in accordance with a linear combination of the steering input and the time derivative of the steering input, or may control the angular directions of both of the front and rear wheels in accordance with different transfer functions between the steering input and the front and rear wheel angles. The negative feedback system is combined with the feedforward system in various ways to provide desired characteristics of the turning behavior. The negative feedback quantity determined by the negative feedback system may be proportional to the sensed turning behavior, or may be determined in accordance with the difference between the sensed turning behavior, and the reference turning behavior calculated from the vehicle speed and steering input.

26 Claims, 24 Drawing Figures

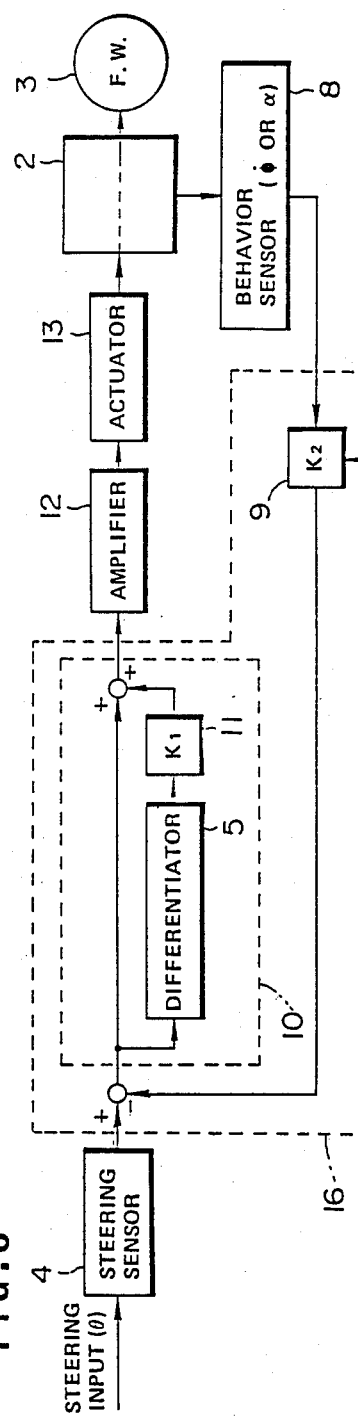
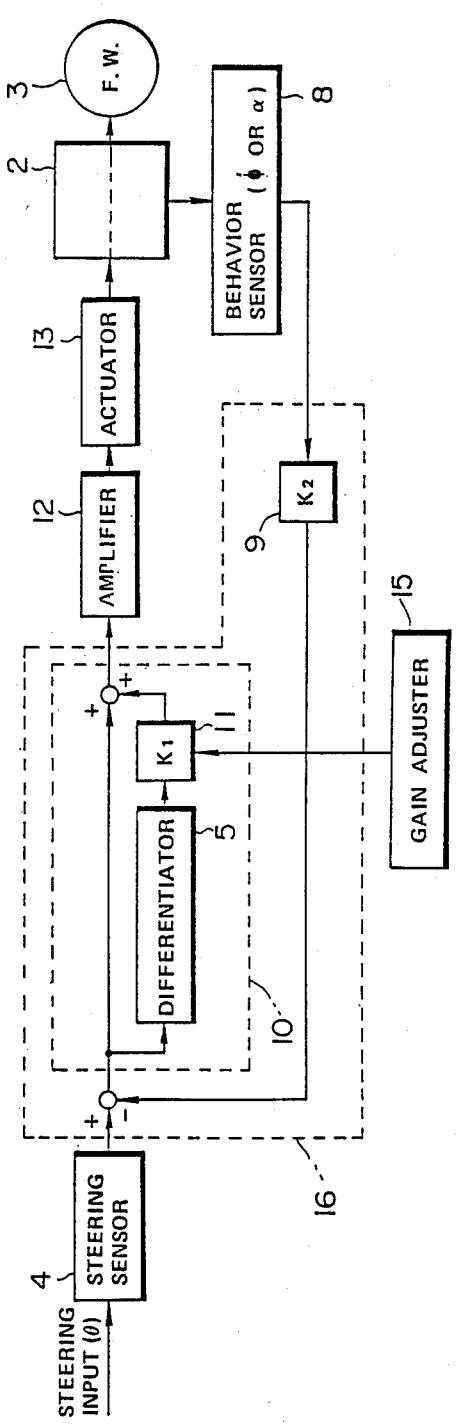

STEERING CONTROL SYSTEM FOR WHEELED VEHICLE

BACKGROUND OF THE INVENTION

The present invention relates to a steering control system for steering a wheeled vehicle so as to improve a steering characteristic, and a directional stability of the vehicle.

A turning behavior and steering stability of a wheeled vehicle are usually described by a relationship between a steering input, and a yaw rate or a lateral acceleration of the vehicle. The steering input is a driver's command to steer the vehicle. In general, a steering angle $\theta$ of a steering wheel is regarded as the steering input. The yaw rate (or yaw angular velocity) is an angular velocity of a rotation of the vehicle about a vertical axis passing through the center of gravity of the vehicle. The lateral acceleration is an acceleration of the center of gravity of the vehicle in a lateral direction of the vehicle.

It is desired that a vehicle should be turned to an amount corresponding to the driver's steering input without being affected by a disturbance such as a side wind and a friction coefficient of a road surface. The amount of a turn of a vehicle can be described in terms of a ratio of the yaw rate $\phi$ (or the lateral acceleration $\alpha$) to the steering input (the steering angle $\theta$ of the steering wheel). This ratio is referred to as a gain of the vehicle, or a yaw rate gain of the vehicle.

In a vehicle having no auxiliary steering control, the gain such as yaw rate gain is enhanced at a certain steering frequency (a resonance frequency H1), as shown by a curve "a" in FIG. 19, so that the behavior of the vehicle responsive to the steering input is changed abruptly at or near this steering frequency. It is desired that, over the full range of the steering frequency, the gain of the vehicle remains at a value obtained when the steering frequency is approximately zero.

Therefore, there have been proposed steering control systems so designed as to make the resonance frequency H1 high and thereby widen the range in which the gain characteristic is flat. One example is shown in FIG. 1. In this system, the steering input is transmitted to the front wheels through the steering gear to steer the vehicle. At the same time, the steering input is sensed by a steering sensor, and differentiated by a differentiator. The derivative determined by the differentiator is sent through an amplifier to an actuator, which steers the front wheels in such a positive direction as to increase the direction change of the vehicle in accordance with the derivative of the steering input. Thus, this system is a feedforward control type. A curve "c" of FIG. 19 shows the gain characteristic obtained by this system. As shown by the curve "b", this system can increase the resonance frequency to H2.

Another example is shown in FIG. 2. This system is a negative feedback type. In this system, the steering input is transmitted through the steering gear to the front wheels to steer the vehicle. At the same time, a vehicle behavior sensor senses a turning behavior of the vehicle, such as the yaw rate or the lateral acceleration of the vehicle. The sensed behavior is multiplied by a feedback coefficient, and sent to an actuator through an amplifier. In accordance with the sensed behavior multiplied by the feedback coefficient, the actuator steers the front wheels in such a negative direction as to reduce the direction change of the vehicle. A curve "c" of FIG. 19 shows the gain characteristic obtained by this system. As shown, this sytem can increase the resonance frequenc to H3.

However, the system of FIG. 1 cannot decrease the gain of the vehicle, and cannot eliminate adverse influence exerted on the turning behavior of the vehicle by a disturbance such as a side wind. The system of FIG. 2 tends to decreas the gain of the vehicle so much that the response characteristic of the turning behavior of the vehicle is made worse.

SUMMARY OF THE INVENTION

It is an object of the present invention to provide a steering control system for a wheeled vehicle, in which a feedforward steering control and a negative feedback steering control are combined so as to provide desired characteristics of a turning behavior of the vehicle.

According to the present invention, a vehicle comprises road wheels, input means, feedforward steering control means, vehicle behavior sensing means, negative feedback steering control means and actuating means. The road wheels may comprise a pair of front wheels and a pair of rear wheels. The input means determines a steering input representing a driver's steering command. The input means may comprise a steering wheel and a steering sensor for sensing an angular displacement of the steering wheel, and the steering input may be the angular displacement of the steering wheel. The feedforward steering control means is connected with the input means for determining a first steering amount from the steering input in accordance with a frequency dependent relationship so designed as to improve a characteristic between a turning behavior of the vehicle and a steering frequency. The vehicle behavior sensing means senses the turning behavior of the vehicle, such as a yaw rate or a lateral acceleration of the vehicle. The negative feedback steering control means is connected with the vehicle behavior sensing means for determining a second steering amount in accordance with the behavior sensed by the behavior sensing means. The actuating means is capable of steering the vehicle by altering the direction of at least one of the road wheels. The actuating means is connected with the feedforward means for steering the vehicle in accordance with the first steering amount in a direction indicated by the steering input, and connected with the feedback means for steering the vehicle in accordance with the second steering amount in such a direction as to reduce the turning behavior of the vehicle.

BRIEF DESCRIPTION OF THE DRAWINGS

FIG. 3 is a block diagram of a front wheel steering control system of a first embodiment of the present invention;

FIG. 4 is a block diagram of a modification of the system of FIG. 3;

DETAILED DESCRIPTION OF THE INVENTION

Figure 1:
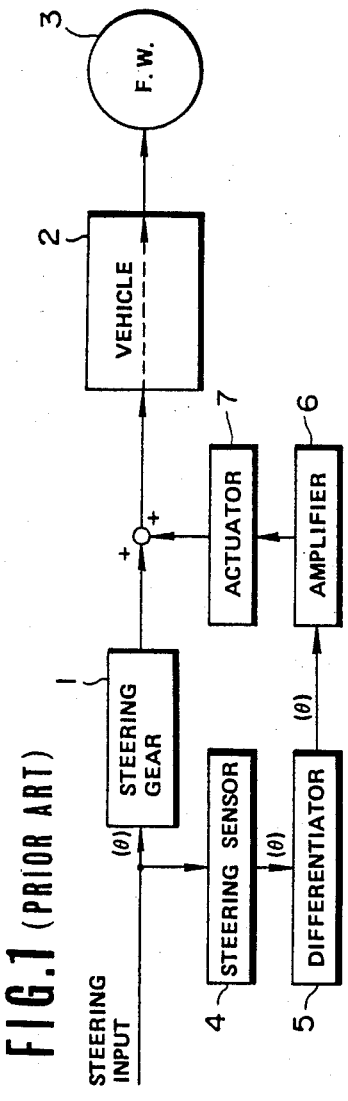
FIGS. 1 and 2 are block diagrams of conventional type steering control systems.
Figure 2:
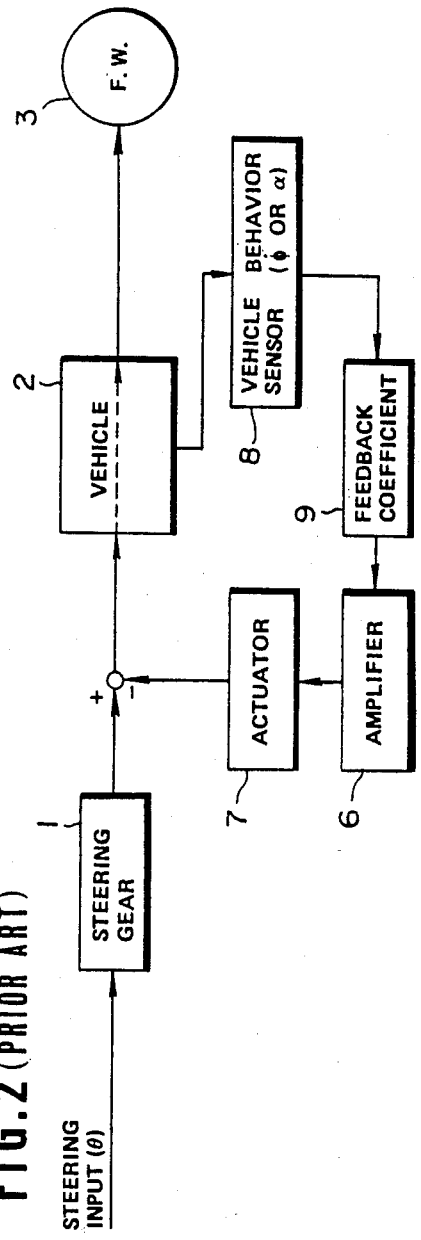

A first embodiment of the present invention is shown in FIG. 3. A steering sensor 4 senses a steering input $\theta$ such as an angular displacement of a steering wheel of the vehicle. A vehicle behavior sensor 8 senses a turning behavior of the vehicle, such as a yaw rate ($\dot{\phi}$ or $\phi$) or a lateral acceleration ($\alpha$) of the vehicle. A control unit 16 comprises a feedback coefficient setter 9 connected with the vehicle behavior sensor 8. The feedback coefficient setter 9 is arranged to determine the product of a predetermined feedback coefficient K2 and the yaw rate or lateral acceleration sensed by the behavior sensor 8. The control unit 16 further comprises a feedforward control circuit 10, and is so arranged that the product determined by the feedback coefficient setter 9 is subtracted from the steering input sensed by the steering sensor 4, and the difference obtained by this subtraction is inputted to the feedforward control circuit 10. Thus, the turning behavior of the vehicle is fed back in such a negative manner as to tend to reduce the turning behavior. The feedforward circuit 10 has a differentiating circuit or differentiator 5 for determining a time derivative (rate-of-change) of the input which is the difference obtained by subtracting the product determined by the feedback coefficient setter 9 from the steering input determined by the steering sensor 4. The feedforward circuit 10 further comprises a feedforward coefficient setter 11 for determining the product of the time derivative of the input of the circuit 10, and a predetermined feedforward coefficient K1. The feedforward circuit 10 produces an output which is equal to the sum of the input of the circuit 10 and the product determined by the feedforward coefficient setter. The output of the feedforward circuit 10 is amplified by an amplifier 12, and then sent to an actuator 13, which steers the front wheels 3 of the vehicle in accordance with the output of the circuit 10.

In this system, the front wheels 3 are primarily steered in accordance with the steering input $\theta$, and at the same time steered secondarily in accordance with the steering input in a feedforward control manner and in accordance with the vehicle turning behavior in a negative feedback control manner so that the feedforward control and the negative feedback control complement each other. Thus, the feedforward steering control provides a secondary steering input which is added to the primary steering input to improve the gain characteristic between the turning behavior of the vehicle and the steering frequency in the sense that the gain characteristic is extended to remain flat over a wider frequency range.

It is preferable to further provide a gain adjuster 15. The gain adjuster 15 controls the gain of the yaw rate or lateral acceleration of the vehicle by varying the feedback coefficient K2 in accordance with any one or more of conditions, such as vehicle speed, force of side wind, weather condition, road condition, acceleration or deceleration of the vehicle, vehicle weight, weight distribution between front and rear axles, and driver's taste. It is preferable to decrease the gain of the vehicle as the vehicle speed increases from the viewpoint of the directional control and stability of the vehicle at high speeds. Therefore, if the gain adjuster 15 employs the vehicle speed, the gain adjuster 15 decreases the gain by increasing the feedback coefficient K2, as the vehicle speed increases. Similarly, the gain should be decreased as the environment of the vehicle become worse for the directional control and stability of the vehicle. Therefore, if the environmental conditions are taken into account, the gain adjuster 15 decreases the gain such as yaw rate gain by increasing the feedback coefficient K2 when the side wind becomes stronger or when the weather becomes rainy or when the road surface becomes rugged. As the acceleration of the vehicle increases, the tendency to power-slide of the vehicle increase. As the deceleration of the vehicle increases, the tendency to tack-in, i.e., for the turning radius to become smaller increases. Therefore, the gain adjuster 15 may be arranged to decrease the gain by increasing the feedback coefficient K2 as the acceleration or deceleration of the vehicle increases. As the weight of the vehicle increases, the lateral grip of the tires in the sidewise direction becomes deficient relatively, so that the stability in steering the vehicle becomes worse. Therefore, the gain adjuster 15 may be arranged to decrease the gain by increasing the feedback coefficient K2 as the vehicle weight increases. As the weight on the rear wheels increases as compared with the weight on the front wheels, the centrifugal force produced on a turn of the vehicle tends to cause the rear end of the vehicle to slide outwardly. Therefore, the gain adjuster 15 may be arranged to decrease the gain by increasing the feedback coefficient K2 as the weight on the rear axle increases. Furthermore, the gain adjuster 15 may be arranged to vary the feedback coefficient K2 in accordance with driver's manual operation so that the control system can provide the yaw rate gain suitable to the driver's taste. Thus, the gain adjuster 15 controls the gain such as the yaw rate gain in accordance with any one or more of the vehicle speed, side wind force, weather condition, road surface condition, rate of change of vehicle velocity with respect to time, vehicle weight, weight distribution between front and rear wheels, and driver's taste.

It is possible to adjust the yaw rate gain or lateral acceleration gain by varying the feedforward coefficient K1 instead of the feedback coefficient K2. In this case, the gain adjuster 15 is connected with the feedforward coefficient setter 11, as shown in FIG. 4, and arranged to decrease the gain of the yaw rate or lateral acceleration of the vehicle by decreasing the feedforward coefficient K1 (instead of increasing the feedback coefficient K2) in accordance with any one or more of the above mentioned conditions in the same manner.

Figure 5:
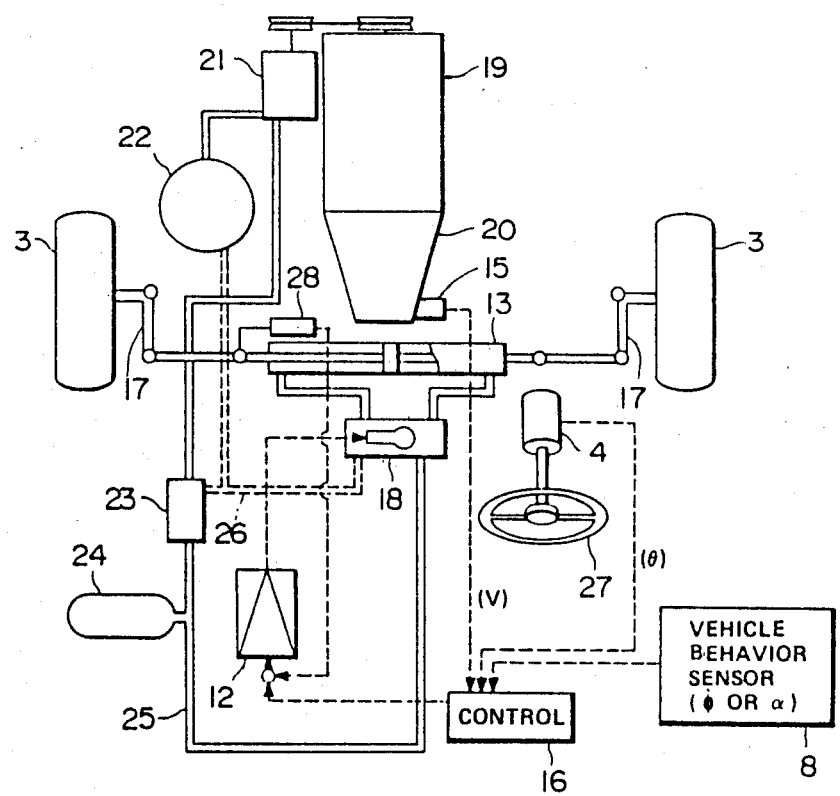
FIG. 5 is a schematic plan view of the system of FIG. 3 or 4.

FIG. 5 shows the control system of FIG. 3 or 4 more concretely. Right and left steering linkages 17 support the right and left front wheels 3, respectively, on a vehicle body so that the front wheels 3 are steerable. The front wheel actuator 13 is interposed between the front steering linkages 17. The actuator 13 is a double-acting hydraulic actuator, and controlled by a servo valve 18.

A hydraulic fluid pressure is supplied to the servo valve 18 by a hydraulic circuit. An oil pump 21 is driven by an engine 19 which is mounted on the vehicle together with a transmission 20. The oil pump 21 sucks oil from an oil reservoir 22, and discharges the oil to an unload valve 23, which controls the pressure of the oil at a predetermined value and supplies the pressurized oil to an accumulator 24. The oil is supplied from the accumulator 24 to the servo valve 18 through a supply conduit 25. A return conduit 26 conveys an unnecessary oil from the servo valve 18 and the unload valve 23.

The servo valve 18 is controlled by an electric signal sent through the amplifier 12 from the control unit 16. In the example of FIG. 5, the gain adjuster 15 has a vehicle speed sensor for sensing an output rpm of the transmission 20 (the vehicle speed V), and is arranged to adjust the gain of the vehicle in accordance with the vehicle speed. The control unit 16 receives the output signal of the steering sensor 4 and the output signal of the vehicle behavior sensor 8, and controls the actuator 13 through the servo valve 18, as mentioned above.

In accordance with the output signal of the control unit 16, the servo valve 18 supplies the oil of the supply conduit 25 to one of two working chambers of the front wheel actuator 13 and makes the other chamber open to the return conduit 26, so that the piston of the actuator 13 moves in a direction determined by the signal of the control unit 16, and steers the front wheels 3 in the determined direction. A front wheel steering angle sensor 28 senses an amount of the angular movement of the front wheels 3. An output signal of the front wheel steering angle sensor 28 is compared with the signal of the control unit 16, and the servo valve 18 stops its control when the sensed amount of the angular displacement of the front wheels 3 is equal to the value of the output signal of the control unit 16. The servo valve 18 can maintaine the angular position of the front wheels 3 at the steering angle determined by the control unit 16, by shutting off both chamber of the actuator 13 from both of the supply and return conduits 26 and 27.

Figure 6:
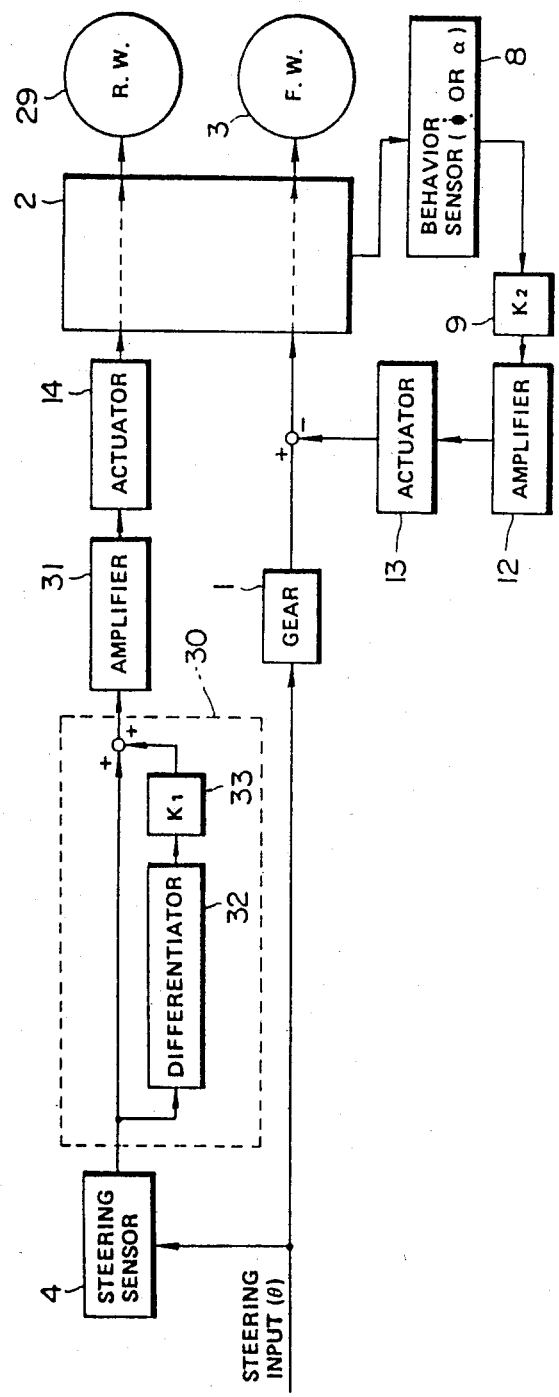
FIG. 6 is a block diagram of a four-wheel steering control system of a second embodiment of the present invention.

A second embodiment of the present invention is shown in FIG. 6. In this embodiment, the front wheels 3 are steered by a steering gear 1 on one hand, and by a negative feedback system on the other hand, and rear wheels 29 of the vehicle are steered by a feedforward system. The negative feedback system comprises the vehicle behavior sensor 8, the feedback coefficient setter 9, the amplifier 12 and the front wheel actuator 13.

The feedforward system for steering the rear wheels 29 comprises the steering sensor 4 for sensing the steering input, a rear wheel steering control circuit 30 similar to the control circuit 10 of FIG. 3, a rear amplifier 31, and a rear wheel actuator 14. The rear wheel steering control circuit 30 has a differentiator 32 and a feedforward coefficient setter 33, and determines a steering angle of the rear wheels 29 in the same manner as the control circuit 10 of FIG. 3.

Figure 7:
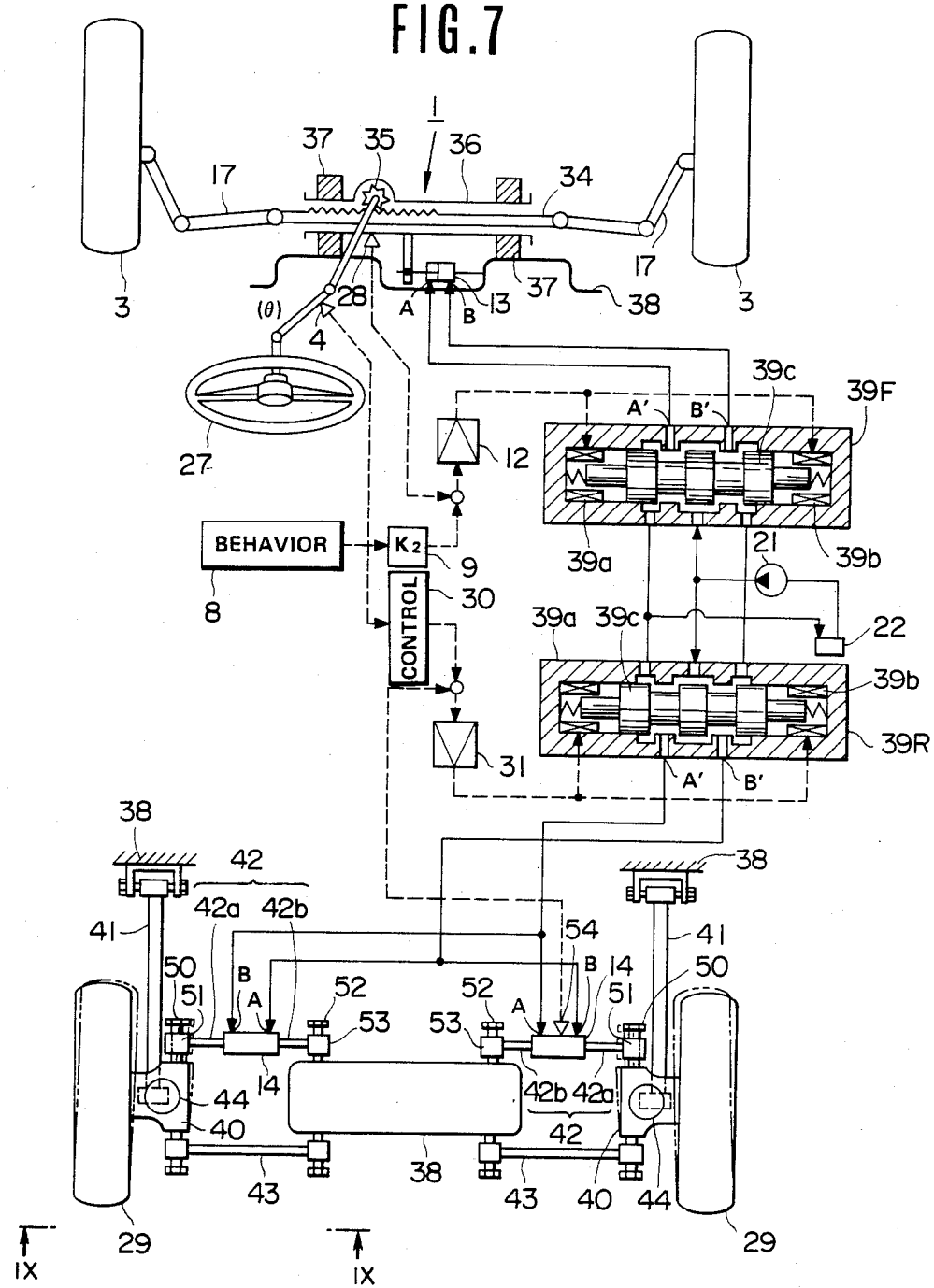
FIG. 7 is a schematic plan view of the system of FIG. 6.

FIG. 7 shows the control system of FIG. 6 concretely. The steering gear 1 of the front wheel steering mechanism has a rack 34 interposed between right and left steering linkages 17 of the right and left front wheels 3, and a pinion 35 which is rotated by a steering wheel 27 and in engagement with the rack 34. A steering gear housing 36 encloses the rack 34 and pinion 35. The steering input $\theta$ applied to the steering wheel 27 by the driver causes the pinion 35 to rotate, and the rack 34 to move longitudinally, so that the front wheels 3 are steered. In order to apply a control action of the negative feedback system to the front wheel steering mechanism, the gear housing 36 is supported on a vehicle body 38 through rubber bushes 37, and made longitudinally movable by the front wheel actuator 13 of a hydraulic type.

Figure 8:
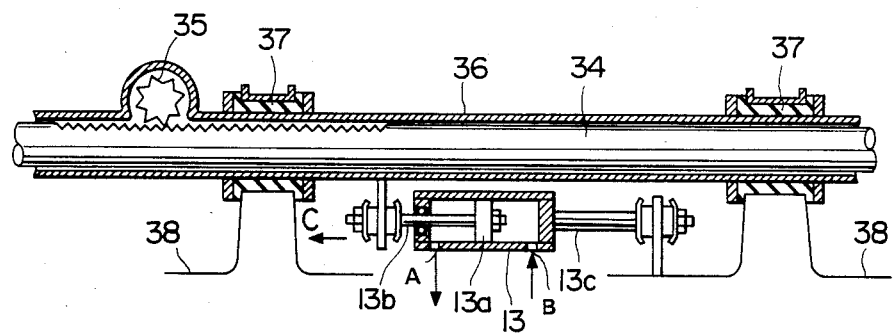
FIG. 8 is a detailed sectional view of a steering gear and a front wheel actuator of FIG. 7.

As shown in FIG. 8, the front wheel actuator 13 has a piston 13a which separates two working chambers having ports A and B, respectively. The actuator 13 further has a piston rod 13b connected with the gear housing 36. The cylinder of the actuator 13 is connected with the vehicle body 38 through a rod 13c. The actuator 13 is controlled by a front electromagnetic spool valve 39F having solenoids 39a and 39b, and a spool 39c. The spool 39c is held at a neutral position shown in FIG. 7 by springs when both of the solenoids 39a and 39b are deenergized. The valve 39F is connected with an oil pump 21 and a reservoir 22. The valve 39F has a port A' connected with the port A of the front wheel actuator 13, and a port B' connected with the port B of the actuator 13.

The solenoid 39a or 39b is energized selectively by the electric signal indicative of the corrective steering angle of the front wheels, which is sent through the amplifier 12 from the feedback coefficient setter 9 responsive to the bahavior sensor 8. When the solenoid 39a is energized and the spool 39c of the valve 39F is moved left in FIG. 7, the fluid pressure is supplied through the port B', and accordingly the piston 13a of the actuator 13 is moved left as shown by an arrow C in FIG. 8. Therefore, the gear housing 36 causes the rubber bushes 37 to deflect, and moves left in FIG. 7, so that the front wheels 3 are steered right. When the solenoid 39b of the valve 39F is energized and the spool 39c is moved right in FIG. 7, the fluid pressure is supplied through the port A', so that the front wheels 3 are steered left. The feedback coefficient setter 9 controls the direction and amount of the corrective steering action of the actuator 13. A front wheel steering angle sensor 28 senses the corrective control action of the actuator 13. The valve 39F is so arranged that the actual amount sensed by the sensor 28 is maintained equal to the desired corrective steering angle.

Figure 9:
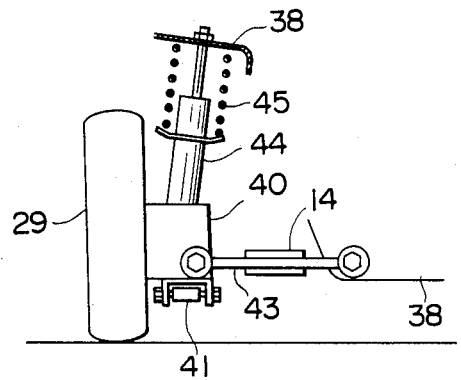
FIG. 9 is an elevation of a rear wheel steering mechanism, as viewed from a line IX—IX of FIG. 7 in a direction shown by arrows.

The rear wheel steering system of FIG. 7 has right and left wheel support members 40 which, respectively, support the rear wheels 29 rotatably. Each of the wheel support members 40 is supported on the vehicle body 38 by a radius rod 41 in the fore and aft direction of the vehicle, and by a pair of parallel lateral rods 42 and 43 in the lateral direction of the vehicle. As shown in FIG. 9, a strut assembly 44 having a suspension spring 45 extends upwardly from each wheel support member 40 to the vehicle body 38.

Figure 10:
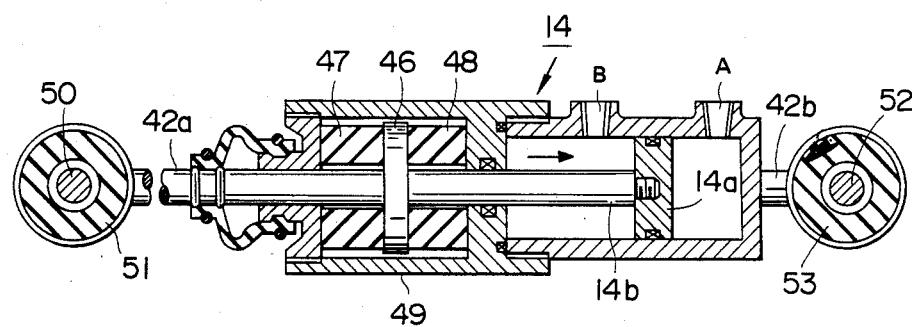
FIG. 10 is a detailed sectional view of a rear wheel actuator of FIG. 7.

The lateral rod 42 of each rear wheel is provided with the actuator 14 of a hydraulic cylinder type so that a toe-in angle of the rear wheel 29 can be varied. FIG. 10 shows the actuator 14 for the left rear wheel 5. As shown in FIG. 10, the actuator 14 has a piston 14a separating two working chambers having, respectively, ports A and B, and a piston rod 14b. The lateral rod 42 is divided into an outer portion 42a and an inner portion 42b. The piston rod 14b is placed between the outer and inner lateral rod portions 42a and 42b so that they are collinear. A circular disc 46 is interposed between the outer lateral rod portion 42a and the piston rod 14b coaxially. The piston rod 14b, the disc 46 and the outer lateral rod portion 42a are fixed together so as to form a single integral unit. The cylinder of the actuator 14 is fixed with the inner lateral rod portion 42b. Annular rubber bushes 47 and 48 are disposed on both sides of the disc 46. A tubular case 49 is fixed with the cylinder of the actuator 14. The tubular case 49 encloses the rubber bushes 47 and 48 so that they are axially immovable.

An outboard end of the outer lateral rod portion 42a is connected with the wheel support member 40 through a rubber bush 51 and a pin 50 fixed to the support member 40 as an outboard end of the lateral rod 43. An inboard end of the inner lateral rod portion 42b is connected with the vehicle body 38 through a rubber bush 53 and a pin 52 fixed to the vehicle body 38 as an inboard end of the lateral rod 43.

The left and right actuators 14 for the left and right rear wheels 29 are controlled by a rear electromagnetic spool valve 39R similar to the front valve 39F. A port A' of the rear valve 39R is connected to the outboard port B of the left actuator 14 for the left rear wheel 29 and the inboard port A of the right actuator 14 for the right rear wheel 29. A port B' of the rear valve 39R is connected to the inboard port A of the left actuator 14 for the left rear wheel 29, and the outboard port B of the right actuator 14 for the right rear wheel 29.

The electric signal indicative of the rear wheel steering angle, produced by the control circuit 30 is sent through the amplifier 31 to the valve 39R. A solenoid 39a or a solenoid 36b of the valve 39R is selectively energized by the signal of the circuit 30. When the solenoid 39b is energized and the spool 39c is moved right in FIG. 7, the valve 39R supplies the fluid pressure through the port A' to the outboard port B of the left rear wheel actuator 14 and the inboard port A of the right rear actuator 14. Therefore, the piston rod 14b of the left rear wheel actuator 14 moves right in FIG. 10 and compresses the rubber bush 48, so that the left rear wheel actuator 14 shortens. Consequently, the left rear wheel 29 is steered to a position shown by a two-dot chain line in FIG. 7. At the same time, the right rear actuator 14 is lengthened, so the right rear wheel 29 is steered in the same direction as the left rear wheel 29. When the solenoid 39a of the valve 39R is energized, the valve 39R moves its spool 39c left in FIG. 7 and supplies the fluid pressure through the port B' to the inboard port A of the left rear wheel actuator 14 and the outboard port B of the right rear wheel actuator 14. Therefore, the right rear wheel 29 is steered to a position shown by a two-dot chain line in FIG. 7 by a contraction of the right rear wheel actuator 14, and at the same time the left rear wheel 29 is steered in the same direction by an expansion of the left rear wheel actuator 14. A rear wheel steering angle sensor 54 senses the steering angle of the rear wheels 5 by sensing a stroke of one of the actuators 14. The control circuit 30 controls steering direction and amount of the rear wheels, and the valve 39R maintains the steering angle sensed by the sensor 54 equal to the desired steering angle.

Figure 11:
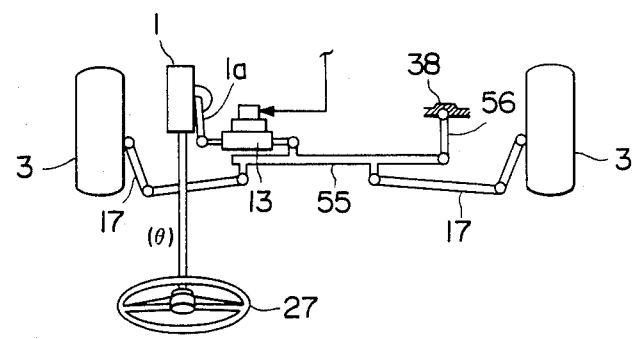
FIG. 11 a schematic plan view of a front wheel steering, mechanism of another example.

It is optional to employ a front wheel steering system shown in FIG. 11 in place of the front wheel steering system shown in FIG. 7. In this example, the right and left steering linkages 17 of the right and left front wheels are connected with each other by a tie rod 55. The tie rod 55 is linked to the vehicle body 38 through a link 56. The steering gear 1 of FIG. 11 is a recirculating ball type. A pitman arm 1a of the steering gear 1 is connected to the tie rod 55 through the front wheel actuator 13.

This actuator 13 is a hydraulic servo actuator. In accordance with the signal of the feedback coefficient setter 9, the actuator 13 is expanded and contracted. Thus, the actuator 13 can steer the front wheels 3 in addition to a steering action of the steering gear 1. When there is no steering action of the actuator 13, the front wheels 3 are steered only by a turning movement transmitted through the steering gear 1, actuator 13, tie rod 55 and linkages 17.

Figure 12:
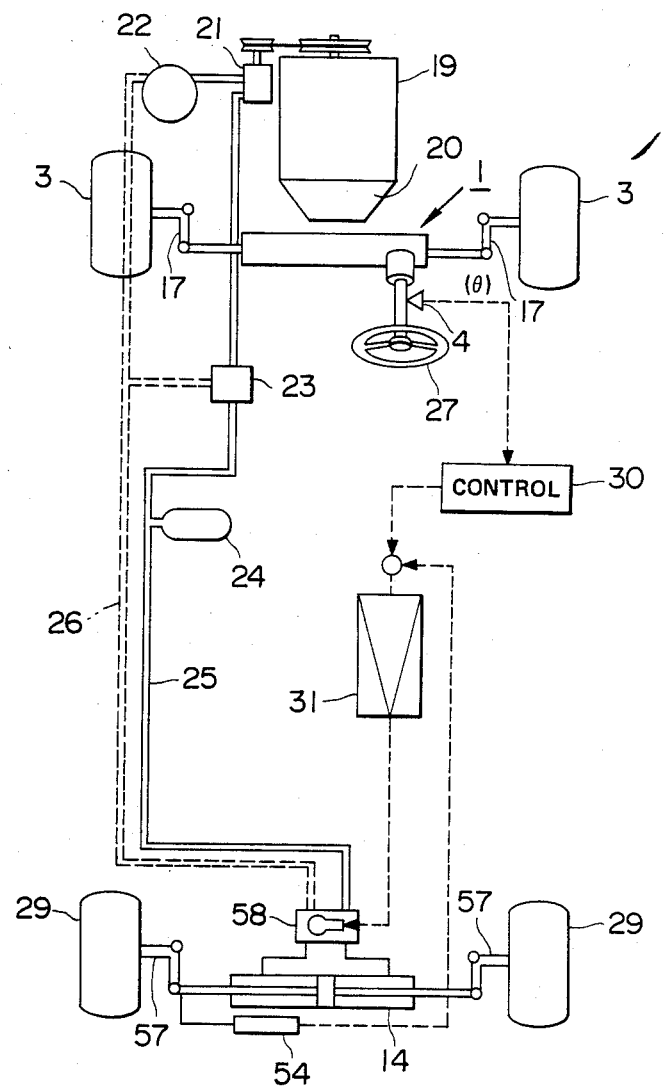
FIG. 12 is a schematic plan view of a rear wheel steering system of another example.

It is optional to employ a rear wheel steering system shown in FIG. 12, in place of the rear wheel steering system of FIG. 7. In FIG. 12, the front wheel steering system is not illustrated because it is the same as that of FIG. 7. Right and left steering linkages 57, respectively, support the rear wheels 29 rotatably. The rear wheel actuator 14 is interposed between the steering linkages 57 so that the actuator 14 can steer the rear wheels 29. A reciprocating movement of a piston of the actuator 14 is controlled by a servo valve 58. The hydraulic fluid is supplied to the servo valve 58 by a hydraulic circuit 21 to 26 which is the same as the hydraulic circuit 21 to 26 shown in FIG. 5.

The servo valve 58 is similar to the servo valve 18 shown in FIG. 5. The output signal of the control circuit 30 is sent through the amplifier 31 to the servo valve 58. In accordance with this signal, the servo valve 58 supplies the oil of the supply conduit 25 to one of two working fluid chambers of the actuator 14 and makes the other chamber open to the return conduit 26. Thus, the actuator 14 can steer the rear wheels 29 through the linkages 57. A rear wheel steering angle sensor 54 senses the amount of the angular displacement of the rear wheels 29. An output signal of the rear wheel steering angle sensor 54 is compared with the output signal of the control circuit 30. The servo valve 58 shuts off the actuator 14 from both of the supply and return conduits 25 and 26 when the steering angle sensed by the rear wheel steering angle sensor 54 is equal to the steering angle determined by the control circuit 30.

Figure 13:
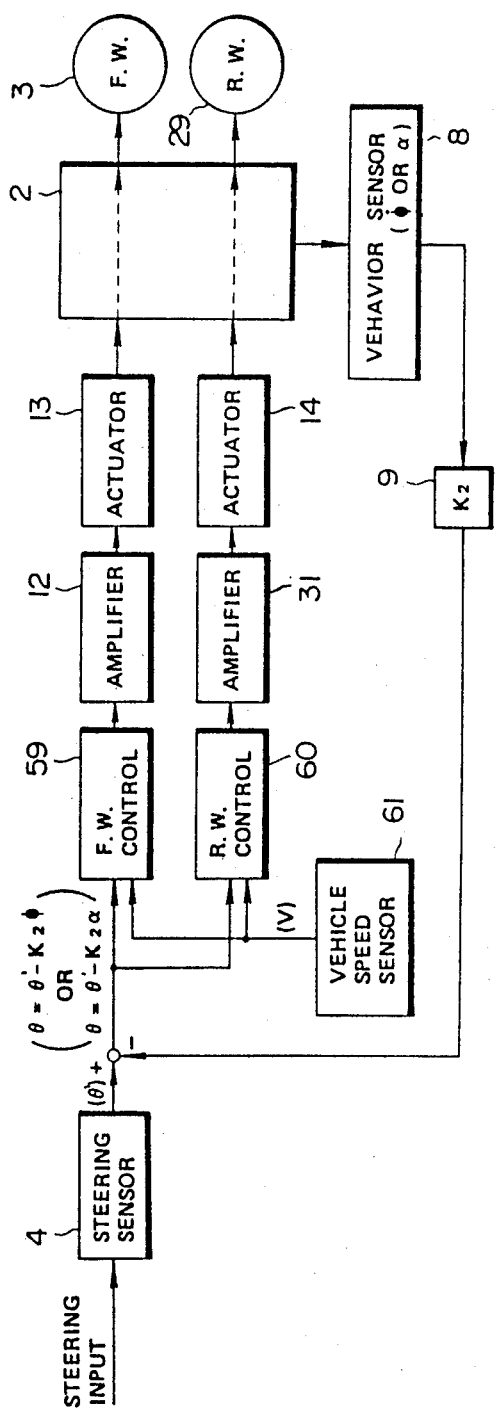
FIG. 13 is a block diagram of a four-wheel steering control system of a third embodiment of the present invention.

A third embodiment of the present invention is shown in FIG. 13. The system of this embodiment comprises a front wheel control circuit 59 and a rear wheel control circuit 60. Each of the control circuits 59 and 60 receives an input signal whose value $\theta$ is equal to the difference obtained by subtracting the product of the feedback coefficient K2 determined by the feedback coefficient setter 9 and the yaw rate $\dot{\phi}$ or lateral acceleration $\alpha$ sensed by the vehicle behavior sensor 8, from the steering input $\theta'$ sensed by the steering sensor 4. That is, $\theta = \theta' - K_2 \dot{\phi}$ or $\theta = \theta' - K_2 \alpha$. Each of the control circuits 59 and 60 further receives a vehicle speed signal produced by a vehicle speed sensor 61. In accordance with these input signals, the control circuit 59 determines a desired steering angle of the front wheels 3 and controls the steering angle of the front wheels 3 through a front amplifier 12 and a front wheel actuator 13. The rear wheel control circuit 60 determines a desired steering angle of the rear wheels 29 and controls the steering angle of the rear wheels 29 through a rear amplifier 31 and a rear wheel actuator 14.

The third embodiment is based on the following consideration.

A movement of a vehicle having steerable front and steerable rear wheels is determined by the sum of a turning behavior due to a yaw rate $\dot{\phi}_1$, and a lateral acceleration $\alpha_1$ which are both caused by a steering angle $\delta_1$ of the front wheels, and a turning behavior due to a yaw rate $\dot{\phi}_2$ and a lateral acceleration $\alpha_2$ which are both caused by a steering angle $\delta_2$ of the rear wheels. Therefore, a total yaw rate $\dot{\phi}$ and a total lateral acceleration $\alpha$ of the vehicle are expressed as follows:

$$\dot{\phi} = \dot{\phi}_1 + \dot{\phi}_2 \ldots \quad (1)$$

$$\alpha = \alpha_1 + \alpha_2 \ldots \quad (2)$$

By using a transfer function $H_1(s)$ between the front wheel steering angle $\delta_1$ and the yaw rate $\dot{\phi}_1$, produced by this steering angle, a transfer function $G_1(s)$ between the front wheel steering angle $\delta_1$ and the lateral acceleration $\alpha_1$ produced by this steering angle, and similar transfer functions $H_2(s)$ and $G_2(s)$ relating the rear wheel steering angle $\delta_2$, respectively, to the resultant yaw rate $\dot{\phi}_2$, and lateral acceleration $\alpha_2$, the quantities $\dot{\phi}_1$, $\dot{\phi}_2$, $\alpha_1$, $\alpha_2$, can be expressed, respectively, as follows:

$$\dot{\phi}_1 = \delta_1 \cdot H_1(s) \ldots \quad (3)$$

$$\dot{\phi}_2 = \delta_2 \cdot H_2(s) \ldots \quad (4)$$

$$\alpha_1 = \delta_1 \cdot G_1(s) \ldots \quad (5)$$

$$\alpha_2 = \delta_2 \cdot G_2(s) \ldots \quad (6)$$

From the expression (1) to (6), the total yaw rate $\dot{\phi}$ and the total lateral acceleration $\alpha$ are:

$$\dot{\phi} = \delta_1 \cdot H_1(s) + \delta_2 \cdot H_2(s) \ldots \quad (7)$$

$$\alpha = \delta_1 \cdot G_1(s) + \delta_2 \cdot G_2(s) \ldots \quad (8)$$

By expressing a transfer function between the steering input $\theta$ and the front wheel steering angle $\delta_1$, and a transfer function between the steering input $\theta$ and the rear wheel steering angle $\delta_2$, respectively, as $X_1(s)$ and $X_2(s)$, the front and rear wheel steering angles $\delta_1$ and $\delta_2$ are expressed as follows:

$$\delta_1 = \theta \cdot X_1(s) \ldots \quad (9)$$

$$\delta_2 = \theta \cdot X_2(s) \ldots \quad (10)$$

Substitution of the front and rear wheel steering angles $\delta_1$ and $\delta_2$ expressed by the equations (9) and (10) into the equations (7) and (8) gives:

$$\dot{\phi} = \theta \cdot X_1(s) \cdot H_1(s) + \theta \cdot X_2(s) \cdot H_2(s) \ldots \quad (11)$$

$$\alpha = \theta \cdot X_1(s) \cdot G_1(s) + \theta \cdot X_2(s) \cdot G_2(s) \ldots \quad (12)$$

It would be ideal if a vehicle could be steered in such a characteristic that there were neither phase lead nor phase lag of the behavior of the vehicle with respect to the steering input, and the gain of the vehicle such as a yaw rate gain would neither increase nor decrease with variation of the steering input. Therefore, it can be considered that satisfactory characteristics of the yaw rate and lateral acceleration can be obtained if the front and rear wheel steering angles are controlled so as to satisfy the following equations.

$$\dot{\phi}/\theta = \dot{\phi}_0 \text{ (constant)} \ldots \quad (13)$$

$$\alpha/\theta = \alpha_0 \text{ (constant)} \ldots \quad (14)$$

It is possible to determine the transfer functions $X_1(s)$ and $X_2(s)$ by using the equations (13) and (14).

Division of both sides of the equations (11) and (12) by $\theta$ gives:

$$\frac{\dot{\phi}}{\theta} = \dot{\phi}_0 = X_1(s) \cdot H_1(s) + X_2(s) \cdot H_2(s) \quad (15)$$

$$\frac{\alpha}{\theta} = \alpha_0 = X_1(s) \cdot G_1(s) + X_2(s) \cdot G_2(s) \quad (16)$$

From the euqations (15) and (16), the transfer functions $X_1(s)$ and $X_2(s)$ are:

$$X_1(s) = \frac{\begin{vmatrix} \dot{\phi}_0 & H_2(s) \\ \alpha_0 & G_2(s) \end{vmatrix}}{\begin{vmatrix} H_1(s) & H_2(s) \\ G_1(s) & G_2(s) \end{vmatrix}} = \frac{\dot{\phi}_0 \cdot G_2(s) - \alpha_0 \cdot H_2(s)}{H_1(s) \cdot G_2(s) - H_2(s) \cdot G_1(s)} \quad (17)$$

$$X_2(s) = \frac{\begin{vmatrix} H_1(s) & \dot{\phi}_0 \\ G_1(s) & \alpha_0 \end{vmatrix}}{\begin{vmatrix} H_1(s) & H_2(s) \\ G_1(s) & G_2(s) \end{vmatrix}} = \frac{\alpha_0 \cdot H_1(s) - \dot{\phi}_0 \cdot G_1(s)}{H_1(s) \cdot G_2(s) - H_2(s) \cdot G_1(s)} \quad (18)$$

In the equations (17) and (18), each of the transfer functions $H_1(s)$, $H_2(s)$, $G_1(s)$ and $G_2(s)$ is known per se. For example, Masato Abe "Sharyo no Undo to Seigyo (Movement and Control of Vehicle)" Kyoritsu Shuppan Kabushiki Kaisha, discloses these transfer functions. The description of this publication necessary to determine these transfer functions is hereby incorporated by reference. Thus, the transfer functions $H_1(s)$, $H_2(s)$, $G_1(s)$ and $G_2(s)$ can be determined easily, so that the transfer functions $X_1(s)$ and $X_2(s)$ to oblain the desired values $\dot{\phi}_0$, $\alpha_0$ can be determined from the equations (17) and (18).

Figure 20A:
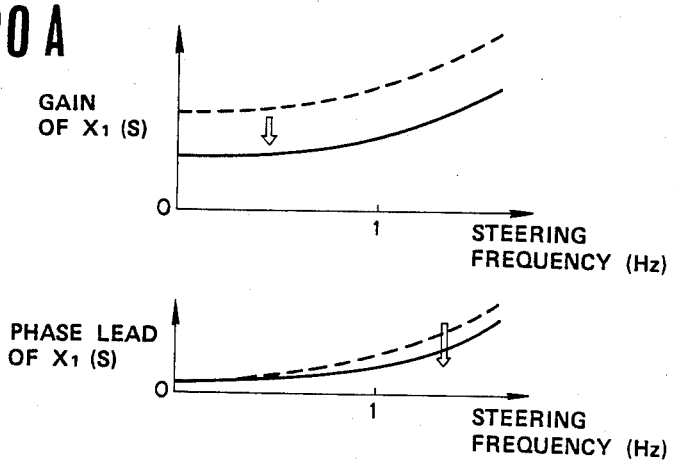
FIGS. 20A and 20B are diagrams showing frequency response characteristics of ideal transfer functions for front and rear wheels.
Figure 20B:
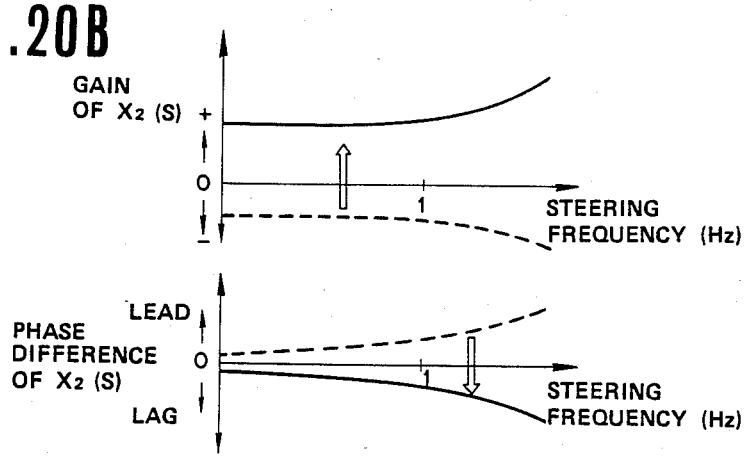

Because each of the transfer functions is a function of a steering frequency, the sign s of each transfer function can be replaced by Jw, provided that J is an imaginary number, and w is the steering frequency. Therefore, the transfer functions $X_1(s)$ and $X_2(s)$ obtained from the equations (17) and (18) provide frequency response characteristics of both gain and phase difference as shown in FIGS. 20A and 20B.

As is known, each of the transfer functions $H_1(s)$, $H_2(s)$, $G_1(s)$ and $G_2(s)$ is a function of the vehicle speed. Accordingly, each characteristic of FIGS. 20A and 20B changes from a broken line curve to a solid line curve with increase of the vehicle speed as shown by an arrow. As shown in FIG. 20A, both of the gain and the phase lead of $X_1(s)$ decrease when the vehicle speed increases. The gain of $X_2(s)$ changes from a negative side to a positive side with increase of the vehicle speed, as shown in FIG. 20B. The phase difference of $X_2(s)$ changes from a phase lead side to a phase lag side with increase of the vehicle speed as shown in FIG. 20B.

The control system of the third embodiment is arranged to determine the front and rear wheel steering angles by using the transfer functions $X_1(s)$ and $X_2(s)$ obtained by the equations (17) and (18), and steer the front and rear wheels individually so that optimum characteristics of the turning behavior of the vehicle can be obtained.

As shown in FIG. 13, each of the front and rear wheel control circuits 59 and 60 receives the steering input $\theta$ which, in this case, is equal to $\theta' - K_2\phi$ (or $\theta' - K_2\alpha$) and the vehicle speed V sensed by the vehicle speed sensor 61, and determines the above-mentioned transfer functions $H_1(s)$, $H_2(s)$, $G_1(s)$ and $G_2(s)$ from the vehicle speed V sensed by the vehicle speed sensor 61 and a steering frequency based on the steering input $\theta$. By using these transfer functions, the front wheel control circuit 59 determines the transfer function $X_1(s)$ corresponding to the desired values $\phi_0$ and $\alpha_0$ from the above-mentioned equation (17). Then, the front wheel circuit 59 determines the steering angle $\delta_1$ of the front wheels 3 from the above-mentioned equation (9) by use of $X_1(s)$ and the steering input $(\theta = \theta' - K_2\phi$ or $\theta = \theta' - K_2\alpha)$. Similarly, the rear wheel control circuit 60 determines the transfer function $X_2(s)$ corresponding to the desired values $\phi_0$ and $\alpha_0$ from the equation (18), and then determines the steering angle $\delta_2$ of the rear wheels 5 from the equation (10).

An output signal of the circuit 59, indicative of the front wheel steering angle $\delta_1$, is sent to the front wheel actuator 13 through the amplifier 12 for amplifying the signal. An output signal of the circuit 60, indicative of the rear wheel steering angle $\delta_2$ is sent to the rear wheel actuator 14 through the amplifier 12. The actuator 13 steers the front wheels 3 through the determined steering angle $\delta_1$ in accordance with the output signal of the circuit 59. The actuator 14 steers the rear wheels 29 through the determined steering angle $\delta_2$ in accordance with the output signal of the circuit 60. Thus, the vehicle 2 is steered through both the front and rear wheels so that the desired values $\phi_0$ and $\alpha_0$ expressed by the equations (13) and (14) can be obtained. Consequently, the steering control system of the third embodiment can improve the vehicle stability and control (or directional control characteristics) remarkably, and make an ideal four-wheel steering possible.

Figure 14A:
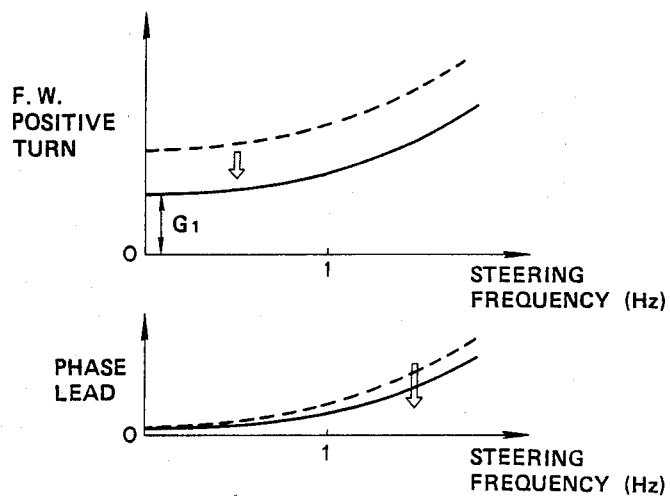
FIGS. 14A and 14B are diagrams showing control characteristics of the front and rear wheels of the system of FIG. 13.
Figure 14B:
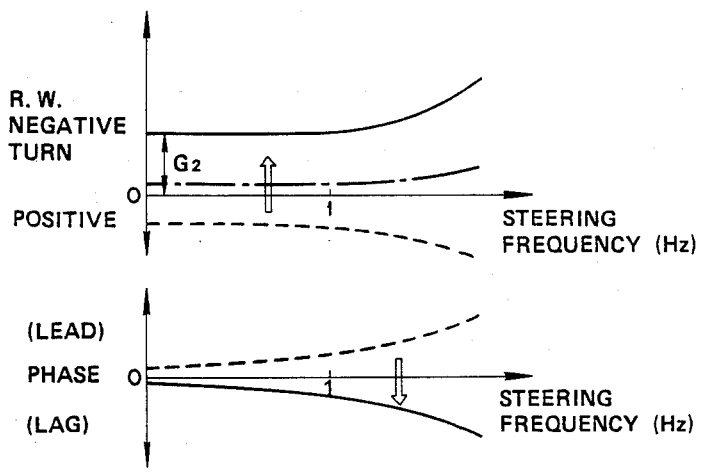

This control system employs the transfer functions $X_1(s)$ and $X_2(s)$ as shown in FIGS. 20A and 20B. Therefore, the response characteristic of the front wheel steering angle is determined by $X_1(s)$, as shown in FIG. 14A. Each characteristic curve of FIG. 14A changes from a broken line to a solid line when the vehicle speed becomes high. As shown, the front wheels 3 are turned in such a positive direction as to increase a direction change of the vehicle. An amount of a turn of the front wheels in the positive direction is decreased as the steering frequency decreases, or as the vehicle speed increases. The response of the front wheels 3 leads the steering input, and the phase lead of the front wheels 3 with respect to the steering input is decreased as the steering frequency decreases or as the vehicle speed increases. The response characteristic of the rear wheel steering angle is determined by $X_2(s)$, as shown in FIG. 14B. Each characteristic curve of FIG. 14B changes from a broken line to a solid line when the vehicle speed becomes high. When the vehicle speed is low, the rear wheels 29 are turned in the positive direction to increase the direction change of the vehicle. (That is, the rear wheels 29 are turned in a direction opposite to a turn direction of the front wheels 3 with respect to a longitudinal line of the vehicle). When the vehicle speed is high, the rear wheels 29 are turned in such a negative direction as to decrease a direction change of the vehicle. (That is, the rear wheels 29 are turned in the same direction as the front wheels 3 are turned). The response of the rear wheels 29 leads the steering input when the vehicle speed is low, and lags the steering input when the vehicle speed is high.

Figure 14C:
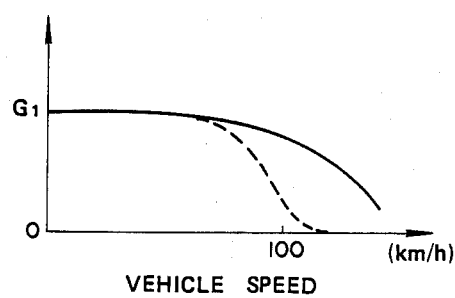
FIGS. 14C and 14D are diagrams showing characteristics of stationary gains of the front and rear wheels, shown FIGS. 14A and 14B.
Figure 14D:
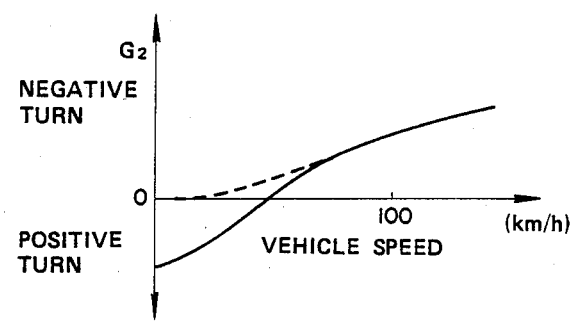

In FIGS. 14A and 14B, $G_1$ and $G_2$ are, respectively, values (stationary gains) of the gains of the front wheels 3 and rear wheels 29 when the steering frequency is approximately zero. The values $G_1$ and $G_2$ vary with the vehicle speed as shown in FIGS. 14C and 14D. As shown by a solid line in FIG. 14C, the amount of a turn of the front wheels 3 in the positive direction decreases when the vehicle speed becomes high. The amount of a turn of the rear wheels 5 in the positive or negative direction is varied as shown by a solid line in FIG. 14D. A broken line of FIG. 14C shows a characteristic obtained when the control of the amount of a turn of the front wheels in the positive direction based on the vehicle speed is not performed. A broken line of FIG. 14D shows a characteristic obtained when the rear wheels are controlled only in the negative direction without a control in the positive direction. The direction control characteristic of the vehicle can be improved even when the characteristics of the broken lines of FIGS. 14C and 14D are employed.

Figure 15:
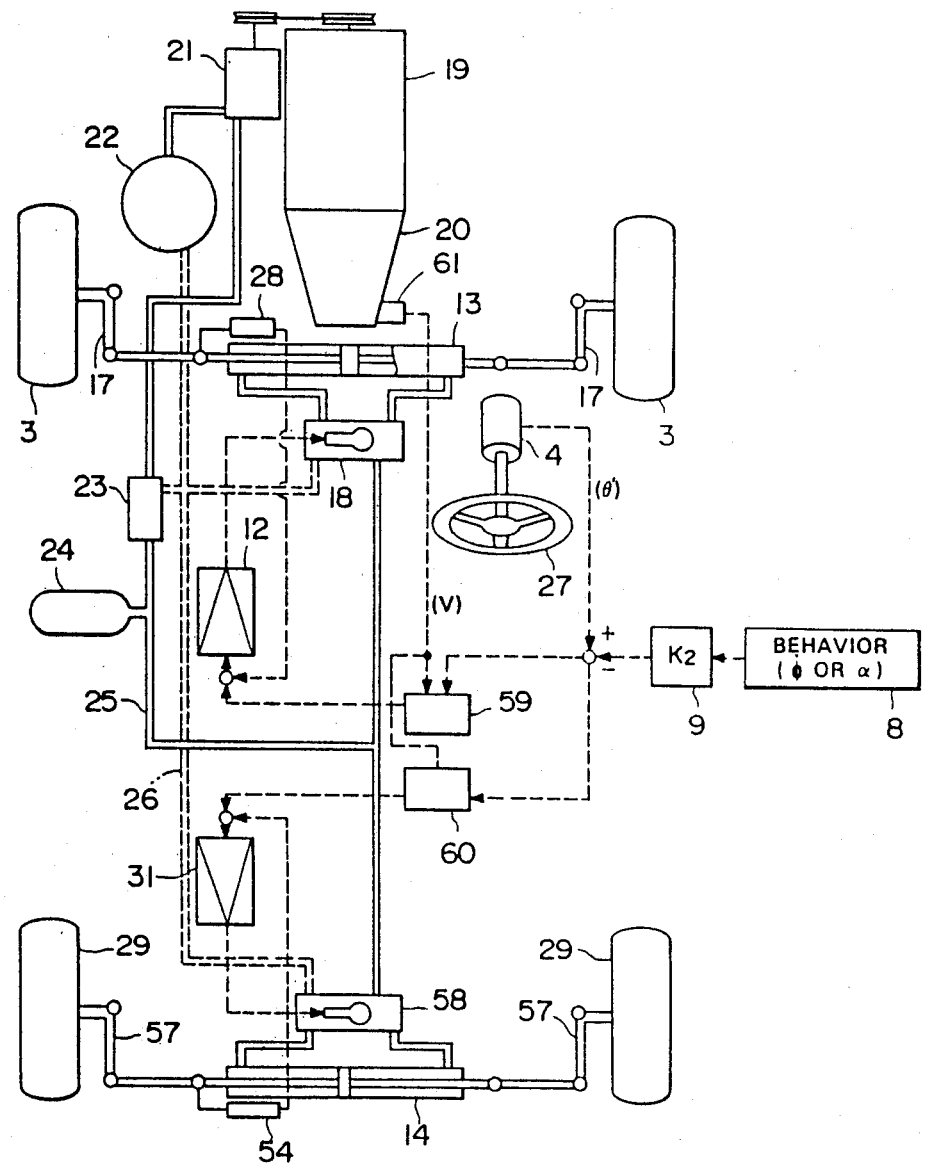
FIG. 15 is a schematic plan view of the system of FIG. 13.

FIG. 15 shows the system of FIG. 13 concretely. In FIG. 15, the front wheel actuator 13 is arranged in the same manner as the actuator 13 of FIG. 5, and the rear wheel actuator 14 is arranged in the same manner as the actuator 14 of FIG. 12. The front and rear wheel control circuits 59 and 60 receive the steering input $\theta$ which is equal to the difference between the steering input $\theta'$ sensed by the steering sensor 4 and the produce $K_2\phi$ (or $K_2\alpha$) determined by the feedback coefficien setter 9, and the vehicle speed V sensed by the vehicle speed sensor 61, and control the front and rear wheels 3 and 29, respectively, through the amplifiers 12 and 31 and the front and rear actuators 13 and 14 in accordance with the determined steering angles $\delta_1$ and $\delta_2$ of the front and rear wheels 3 and 29. Thus, the steering angle of the front wheels 3 is maintained equal to $\delta_1$, and the steering angle of the rear wheels 29 is maintained equal to $\delta_2$.

Figure 16:
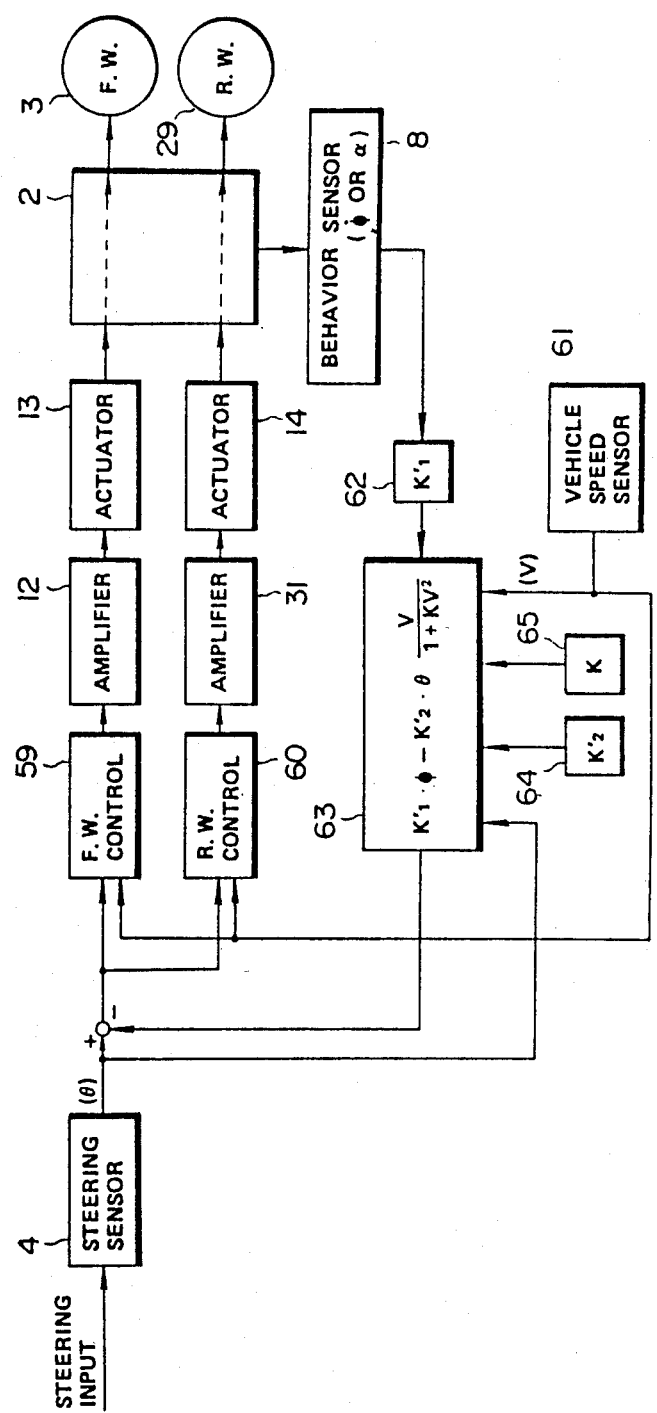
FIGS. 16 and 17 are block diagram of four-wheel steering control systems of fourth and fifth embodiments of the present invention.

A fourth embodiment of the present invention is shown in FIG. 16. In this embodiment, the feedforward system comprising the circuits 59 and 60 is the same as that of FIG. 13. The negative feedback system of the fourth embodiment is different from that of FIG. 13. The vehicle behavior sensor 8 senses the yaw rate $\phi$ of the vehicle 2, representing an actual turning behavior of the vehicle and inputs the sensed yaw rate $\phi$ to a first feedback coefficient setter 62. The first coefficient setter 62 determines the product of a first feedback coefficient $K'_1$ and the sensed yaw rate, and inputs the determined product $K'_1\cdot\phi$ to an operational circuit 63. The first coefficient $K'_1$ is equal to 1.0 in this embodiment.

The operational circuit 63 further receives the steering input (the steering angle $\theta$ of the steering wheel)

sensed by the steering sensor 4, a second coefficient $K'_2$ determined by a second coefficient setter 64, a constant K (stability factor) determined by a constant setter 65, and the vehicle speed V sensed by the vehicle speed sensor 61. In this embodiment, the second coefficient $K'_2$ is equal to 0.7. From these input data, the operational circuit 63 determines the quantity $$K_1' \cdot \phi - K_2' \frac{V}{(1 + KV^2)} \theta$$

and produce a negative feedback signal indicative of the determined quantity.

In this embodiment, an actual turning behavior of the vehicle 1 is represented by the yaw rate sensed by the behavior sensor 8, and the quantity $$\frac{V}{(1 + KV^2)} \theta$$

represents a desired reference turning behavior of the vehicle determined by the vehicle speed V and the steering input. Therefore, the difference obtained by subtracting the reference turning behavior multiplied by the second coefficient from the actual turning behavior multiplied by the first coefficient is fed back to a point between the steering sensor 4 and the input terminals of the control circuits 59 and 60, in a negative manner. A feedback gain is determined by a quantity $K'_1 - K'_2$. The feedback gain is normally equal to 0.3 because the first coefficient is equal to 1.0 and the second coefficient is equal to 0.7.

When the steering wheel is not turned, the quantity $$\frac{V}{(1 + KV^2)} \theta$$

calculated by the operational circuit 63 is equal to zero because the steering input $\theta$ is equal to zero. If there is no disturbance such as a side wind, and the yaw rate $\dot{\phi}$ is equal to zero, then the quantity $K'_1 \phi$ is also zero. Therefore, the operational circuit 63 make the negative feedback signal equal to zero. In this state, the control circuits 59 and 60 can prevent the front and rear wheels 3 and 29 from being steered uselessly.

If a disturbance arises and causes the yaw rate during the absence of the steering input, then the quantity $K'_1 \phi$ deviates from zero while the quantity $$\frac{V}{(1 + KV^2)} \theta$$

remains equal to zero. As mentioned above, the first coefficient $K'_1$ is equal to one in this embodiment, so that $K'_1 \phi = \phi$. Therefore, 100 percent of the yaw rate caused by the disturbance is fed back negatively. Therefore the circuits 59 and 60 steers the front and rear wheels so as to eliminate the yaw rate caused by the disturbance completely whereas the steering input remains zero.

When the steering wheel is turned, the operational circuit 63 produces the negative feedback signal indicative of the difference obtained by the subtraction whose minuend is the product of the first coefficient $K'_1$ and the sensed yaw rate $\phi$ and whose subtrahend is the product of the second coefficient $K'_2$ and the quantity $$\frac{V}{(1 + KV^2)} \theta.$$

In this case, the feedback gain is determined by the difference obtained by subtracting the second coefficient $K'_2$ from the first coefficient $K'_1$. In this embodiment, the feedback gain is normally set equal to 0.3 by setting the first coefficient K1 equal to 1.0 and the second coefficient K2 equal to 0.7, so that the desired steering control of the front and rear wheels can be obtained.

The front and rear wheel steering systems of the fourth embodiment are the same as those of FIG. 15 except that the coefficient setter 9 of FIG. 15 is replaced by the coefficient setter 62 and the operational circuit 63 of FIG. 16 in the fourth embodiment.

Figure 17:
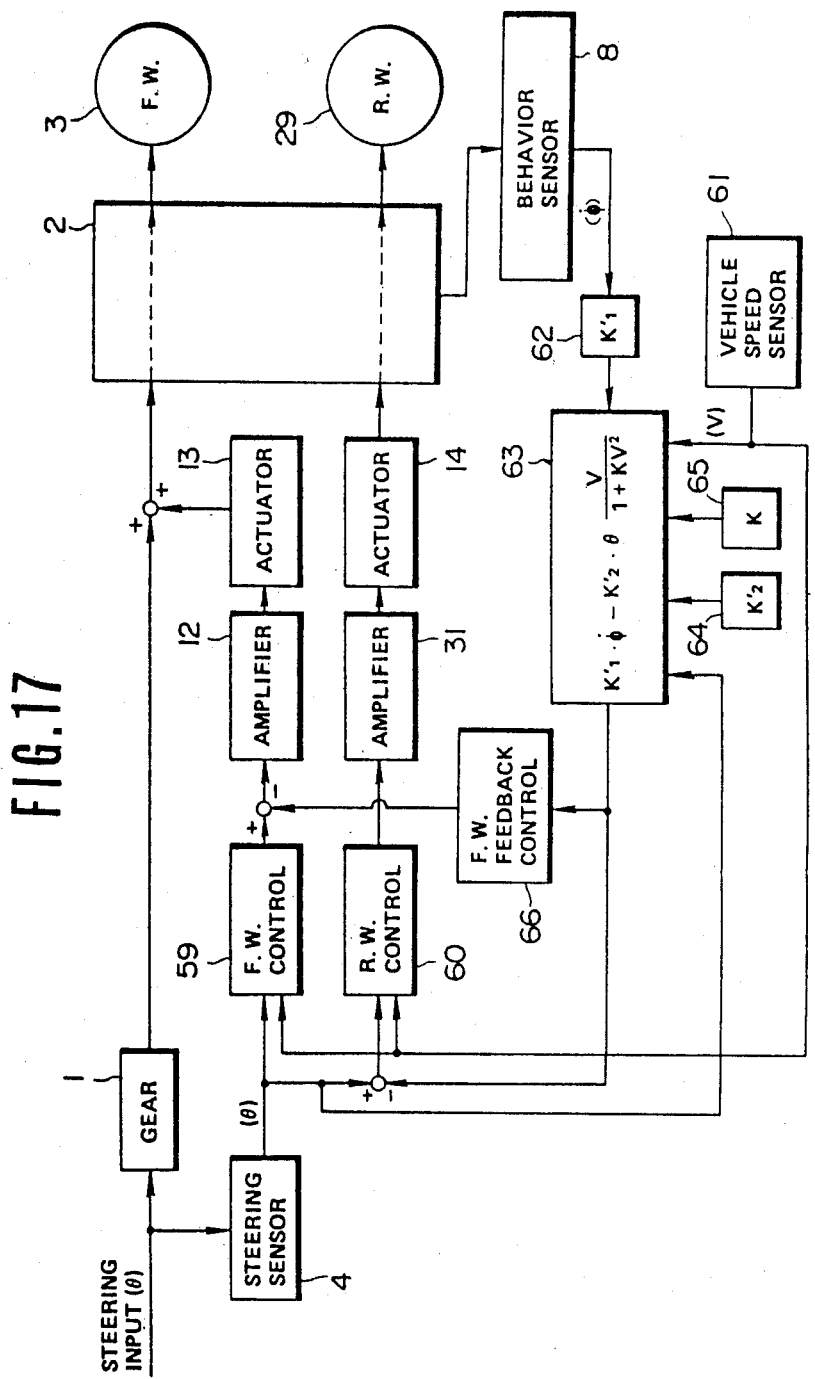

A fifth embodiment of the present invention is shown in FIG. 17. In the fifth embodiment, the control system for controlling the steering angle of the rear wheels 29 is the same as that of FIG. 16. The control system for the front wheels 3 is different from that of FIG. 16 in the following points. As shown in FIG. 17, the front wheels 3 are steered first by the steering gear 1, and secondly by the system of the front wheel control circuit 59, front amplifier 12, and front wheel actuator 13. Unlike the front wheel control circuit 59 of FIG. 16, the front wheel control circuit 59 of the fifth embodiment is arranged to receive the steering input sensed by the steering sensor 4 (instead of the signal equal to the difference between the sensed steering input and the negative feedback signal) in order to obtain the above-mentioned desired steering angle $\delta_1$ of the front wheels 3 by the combination of the steering gear 1 and the system of the front wheel control circuit 59. The front wheel control circuit 59 of the fifth embodiment uses a value $X_1'$ obtained by subtracting a transfer function $X_1(s)'$ of the front wheel steering mechanism including the steering gear 1 from the transfer function $X_1(s)$ obtained from the above-mentioned equation (17) (i.e. $X_1' = X_1(s) - X_1(s)'$), and determines a corrective steering angle $\delta_1'$ for the front wheels 3 from an equation $\delta_1' = \theta \cdot X_1'$, which corresponds to the equation (9). The control circuit 59 steers the front wheels 3 through the amplifier 12 and the front wheel actuator 13 in accordance with the determined corrective steering angle $\delta_1'$ in such a manner as to give assistance to the front wheel steering mechanism. A front wheel feedback control circuit 66 shown in FIG. 17 is arranged to modify the value of the negative feedback signal outputted by the operational circuit 63, and feed back the modified signal negatively to a junction point between the output terminal of the front wheel control circuit 59 and the amplifier 12 in order to make a characteristic of the front wheel steering angle $\delta_1$ with respect to the negative feedback signal of the operational circuit 63, similar to that of FIG. 13.

Figure 18:
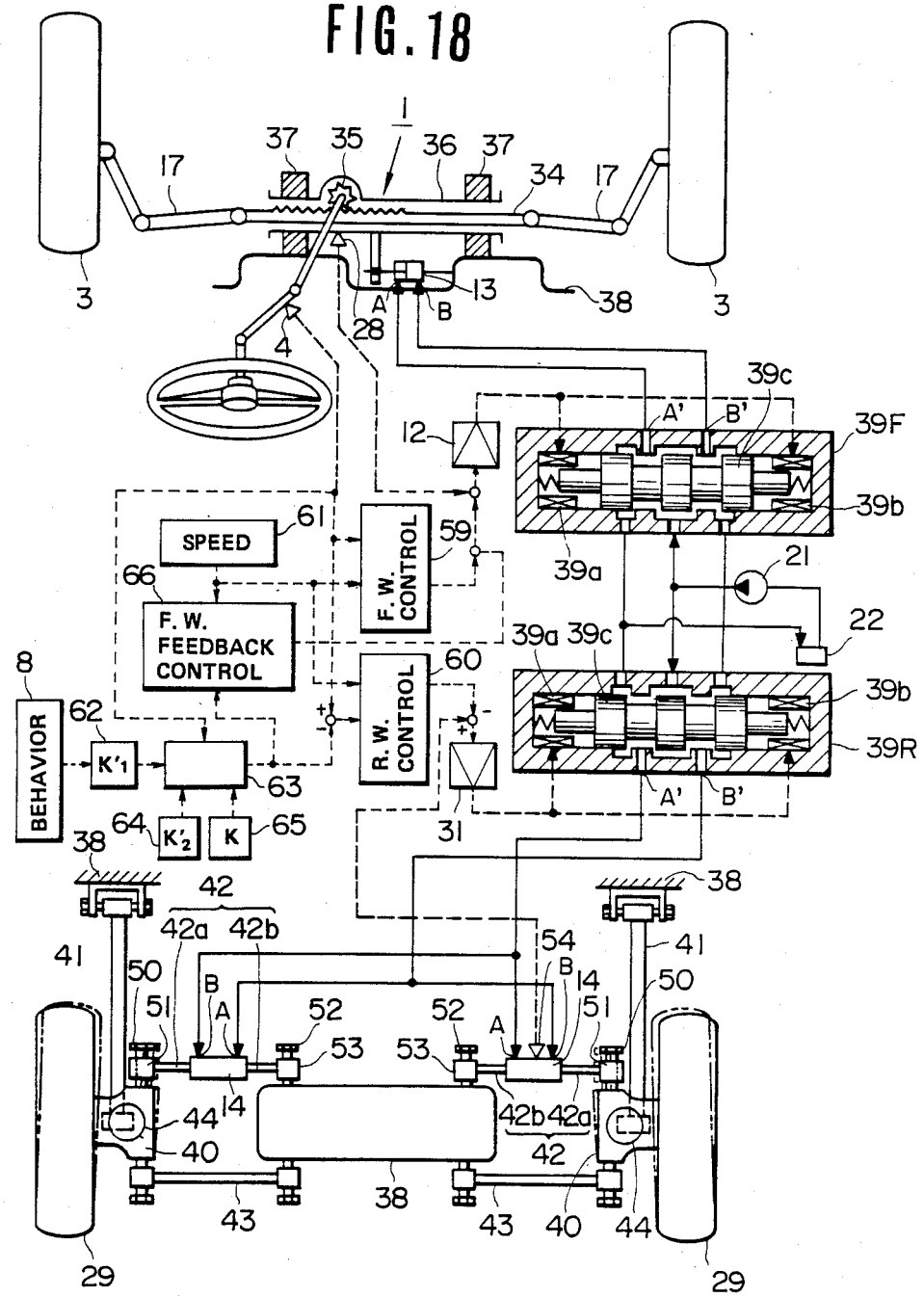
FIG. 18 is a schematic plan view of the system of FIG. 17.
Figure 19:
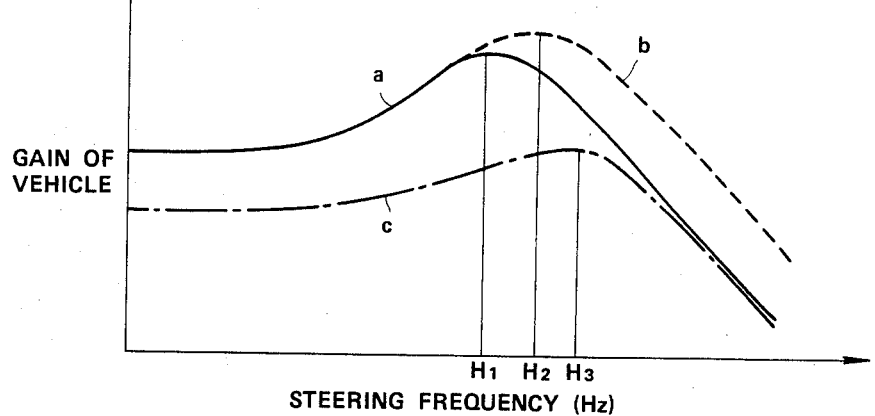
FIG. 19 is a diagram showing characteristics between the gain of a vehicle and a steering frequency.

FIG. 18 shows the system of the fifth embodiment concretely. The front and rear wheel steering mechanisms, the front and rear wheel actuators 13, 14, and the electromagnetic spool valves 39F and 39R of FIG. 18 are the same as those of FIG. 7. The valves 39F and 39R are controlled, respectively, by the control circuits 59 and 60 arranged as shown in FIG. 17.

What is claimed is:

1. A vehicle comprising:
   road wheels, input means for determining a steering input representing a driver's steering command, feedforward steering control means, connected with the input means, for determining a first steering amount from the steering input in accordance with a relationship so designed as to improve a characteristic between a turning behavior of the vehicle and a steering frequency, vehicle behavior sensing means for sensing the turning behavior of the vehicle, negative feedback steering control means, connected with the vehicle behavior sensing means, for determining a second steering amount in accordance with the behavior of the vehicle sensed by the behavior sensing means, and actuating means capable of steering the vehicle by altering the direction of at least one of the road wheels, the actuating means being connected with the feedforward means for steering the vehicle in accordance with the first amount in a direction indicated by the steering input, and with the feedback means for steering the vehicle in accordance with the second steering amount in such a direction as to reduce the turning behavior of the vehicle.

2. A vehicle according to claim 1, wherein the feedforward means determines the first steering amount so that the first steering amount is equal to the sum of the steering input, and the time rate-of-change of the steering input multiplied by a feedforward coefficient.

3. A vehicle according to claim 2, wherein the feedback means determines the second steering amount so that the second steering amount is equal to the product of the behavior sensed by the vehavior sensing means and a feedback coefficient.

4. A vehicle according to claim 3, wherein the feedback means is connected between the input means and the feedforward means so that the second amount is subtracted from the steering input determined by the input means, and the difference obtained by the subtraction is inputted to the feedforward means as the steering input.

5. A vehicle according to claim 4, wherein the road wheels comprises a pair of front wheels and a pair of rear wheels, and the actuating means is arranged to steer the vehicle by altering the direction of the front wheels in accordance with the first steering amount.

6. A vehicle according to claim 5, further comprising gain adjusting means connected with the feedback means for modifying the value of the feedback coefficient.

7. A vehicle according to claim 5, further comprising gain adjusting means connected with the feedforward means for modifying the value of the feedforward coefficient.

8. A vehicle according to claim 3, wherein the road wheels comprises a pair of front wheels and a pair of rear wheels, the input means comprises a steering wheel and a steering sensor for sensing an angular displacement of the steering wheel and producing a steering input signal indicative of the steering input, and the vehicle further comprises a front wheel steering mechanism connected between the steering wheel and the front wheels for transmitting a turning movement of the steering wheel to the front wheels, and wherein the feedforward means is connected with the steering sensor to receive the steering input signal.

9. A vehicle according to claim 8, wherein the actuating means comprises front actuating means capable of steering the front wheels by actuating the front wheel steering mechanism, and rear actuating means capable of steering the rear wheels, and wherein the feedforward means is connected with the rear actuating means so as to steer the rear wheels in accordance with the first steering amount, and the feedback means is connected with the front actuating means so as to steer the front wheels in accordance with the second steering amount.

10. A vehicle according to claim 1, wherein the road wheels comprises a pair of front wheels and a pair of rear wheels, the actuating means comprises front actuating means capable of steering the front wheels and rear actuating means capable of steering the rear wheels, and the feedforward means comprises front wheel control means connected with the input means for determining a first output angle from the steering input in accordance with a first transfer characteristic between the steering input and the first output angle and controlling the front actuating means so that the steering angle of the front wheels is maintained equal to the first output angle, and rear wheel control means connected with the input means for determining a second output angle from the steering input in accordance with a second transfer characteristic between the steering input and the second output angle, and controlling the rear actuating means so that the steering angle of the rear wheels is maintained equal to the second output angle.

11. A vehicle according to claim 10, further comprising a vehicle speed sensor for sensing a speed of the vehicle and sending a vehicle speed signal to the front control means, and wherein the first transfer characteristic is a function of the vehicle speed and a steering frequency.

12. A vehicle according to claim 11, wherein the feedback means is connected between the input means and the feedforward means so that the second amount is subtracted from the steering input determined by the input means, and the difference obtained by the subtraction is inputted to the feedforward means as the steering input.

13. A vehicle according to claim 12, wherein the gain of the first transfer characteristic increase as the steering frequency increases, and decreases as the vehicle speed increases.

14. A vehicle according to claim 13, wherein the first transfer characteristic is chosen so that the phase of the first output angle leads the phase of the steering input, and that the phase lead of the first output angle relative to the steering input increases as the steering frequency increases, and decreases as the vehicle speed increases.

15. A vehicle according to claim 14, wherein the second transfer characteristic is chosen so that the rear wheels are turned in a positive direction opposite to a direction of the front wheels in a low vehicle speed range and in a negative direction which is the same as the direction of the front wheels in a high vehicle speed range, and that the phase of the second output angle leads the phase of the steering input in the low vehicle speed range and lags the phase of the steering input in the high vehicle speed range.

16. A vehicle according to claim 15, wherein the gain of the second transfer characteristic increase as the steering frequency increase at least in the high vehicle speed range.

17. A vehicle according to claim 12, wherein the feedback means determines the second steering amount so that the second amount is equal to the product of the vehicle behavior sensed by the vehicle behavior sensing means and a feedback coefficient.

18. A vehicle according to claim 12, wherein the feedback means is connected with the input means to receive a signal indicative of the steering input determined by the input means, and the vehicle speed sensor to receive the vehicle speed signal, and arranged to determine the second steering amount so that the second steering amount is equal to the difference obtained by subtracting the product of a second feedback coefficient and a desired reference turning behavior of the vehicle which is a function of the vehicle speed and the steering input, from the product of a first feedback coefficient and the turning behavior sensed by the vehicle behavior sensing means.

19. A vehicle according to claim 18, wherein the vehicle behavior sensing means senses a yaw rate of the vehicle as the turning behavior of the vehicle, and the desired reference turning behavior is equal to $$\theta \frac{V}{1 + KV^2}$$

where $\theta$ is the steering input, V is the vehicle speed, and K is a predetermined constant.

20. A vehicle according to claim 11, wherein the input means comprises a steering wheel and a steering sensor for sensing an angular displacement of the steering wheel as the steering input, and the vehicle further comprises a front wheel steering mechanism connected between the steering wheel and the front wheels for transmitting a turning movement of the steering wheel to the front wheels, and wherein the front wheel control means is connected with the steering sensor to receive the steering input sensed by the steering sensor, and the feedback means is connected between the steering sensor and the rear wheel control means so that the second steering amount is subtracted from the steering input sensed by the steering sensor and the difference obtained by the subtraction is inputted to the rear wheel control means as the steering input.

21. A vehicle according to claim 20, wherein the front actuating means is arranged to steer the front wheels by moving the front wheel steering mechanism, and the front wheel control means controls the front actuating means by sending a control signal thereto so that the front wheel steering mechanism maintains the steering angle of the front wheels equal to the first output angle determined by the front wheel control means.

22. A vehicle according to claim 21, wherein the feedback means comprises front wheel feedback means which determines a front feedback quantity in accordance with the second steering amount, and modify the control signal sent from the front wheel control means to the front actuating means so that the front feedback quantity is subtracted from the value of the control means.

23. A vehicle according to claim 1, wherein the road wheels comprises a pair of front wheels and a pair of rear wheels, and the actuating means comprises front actuating means which comprises right and left steering linkages for supporting the right and left front wheels so that the front wheels are steerable, and a front hydraulic actuator connected between the right and left steering linkages.

24. A vehicle according to claim 1, wherein the road wheels comprises a pair of front wheels and a pair of rear wheels, the input means comprises a steering wheel, and the vehicle further comprises a front wheel steering mechanism comprising a steering gear assembly which comprises a pinion rotated by the steering wheel, a rack which engaged with the pinion and is capable of steering the front wheels, and a gear housing enclosing the rack and pinion, the gear housing being supported on a body of the vehicle through rubber bushes so that the gear housing is movable longitudinally, and wherein the actuating means comprises a front hydraulic actuator comprising a cylinder fixed to the vehicle body and a piston connected with the gear housing for moving the gear housing longitudinally.

25. A vehicle according to claim 24, wherein the actuating means comprises a right pair of first and second lateral rods extending along a lateral line of the vehicle and connecting the right rear wheel to the vehicle body, and a left pair of first and second lateral rods extending along the lateral line of the vehicle and connecting the left rear wheel to the vehicle body, the first lateral rod of each pair being divided into an inner rod portion and an outer rod portion, the rear actuating means further comprising a right rear hydraulic actuator disposed between the inner and outer rod portions of the first lateral rod of the right pair so that the length of the first lateral rod is variable, and a left rear hydraulic actuator disposed between the inner and outer rod portions of the first lateral rod of the left pair so that the length of the first lateral rod is variable, each of the rear actuators comprises a cylinder fixed to the inner rod portion, a piston separating two working fluid chambers, and a piston rod which is fixed with the piston and the outer rod portion, and formed with an outerward flange interposed between two rubber bushes so that the flange deflects one of the rubber bushes when the piston rod moves axially.

26. A vehicle according to claim 1, wherein the road wheels comprises a pair of front wheels and a pair of rear wheels, the input means comprises a steering wheel, the actuating means comprises a front hydraulic actuator, and the vehicle further comprises a front steering mechanism comprising a recirculating ball type steering gear having a pitman arm, right and left steering linkages for supporting the right and left front wheels, and a tie rod connecting the right and left steering linkages, the tie rod being connected with the pitman arm through the front hydraulic actuator.

* * * * *